J. T. DUNHAM.

COMBINED TAG AND ENVELOPE.

No. 10,488. Reissued June 10, 1884.

WITNESSES.

Geo. H. Fraser

E. B. Bolton

INVENTOR:

Joseph T. Dunham

By his Attorneys,

Burke, Fraser & Connett.

THE NORRIS PETERS CO., WASHINGTON, D. C.

UNITED STATES PATENT OFFICE.

JOSEPH T. DUNHAM, OF BROOKLYN, NEW YORK.

COMBINED TAG AND ENVELOPE.

SPECIFICATION forming part of Reissued Letters Patent No. 10,488, dated June 10, 1884.

Original No. 277,245, dated May 8, 1883. Application for reissue filed March 18, 1884.

*To all whom it may concern:*

Be it known that I, JOSEPH T. DUNHAM, of Brooklyn, Kings county, New York, have invented a new and Improved Combined Tag and Envelope, of which the following is a full, clear, and exact description.

My invention consists in a tag provided with means for attaching it to the merchandise, and with an envelope or pocket to receive a bill or invoice of the merchandise.

In order that my invention may be the better understood, reference may be had to the accompanying drawings, forming part of this specification, wherein I have shown my combined tag and envelope in its preferred form.

Figure 1:
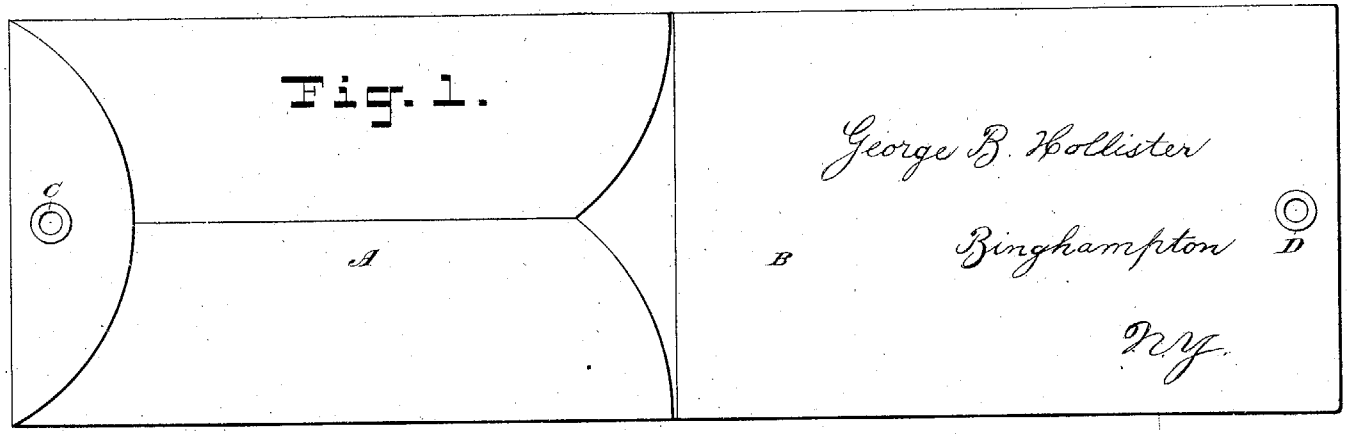
Figure 2:
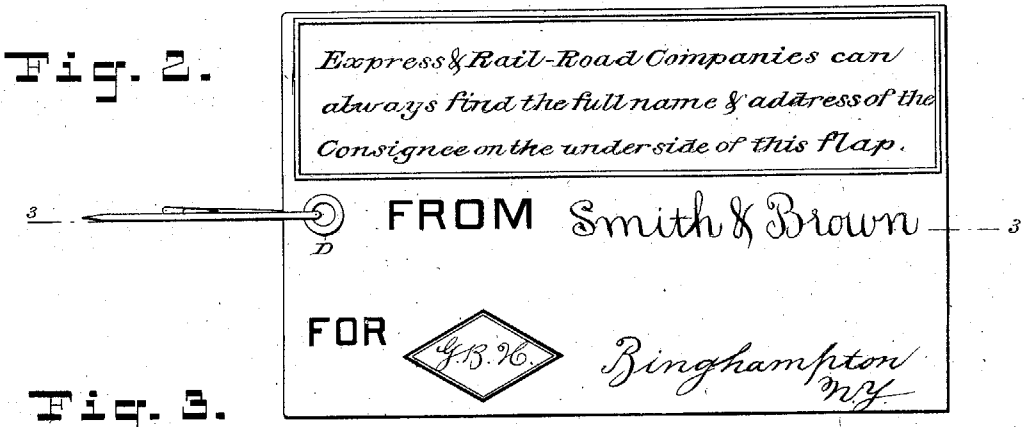
Figure 3:
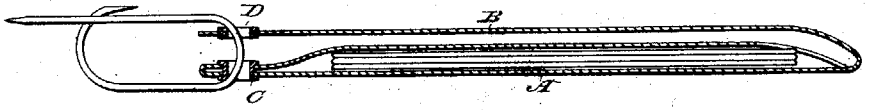

Figure 1 is a longitudinal view of my improved combined tag and envelope, showing it opened. Fig. 2 is a longitudinal view of the same, showing it closed; and Fig. 3 is a longitudinal sectional elevation of the same on the line *z z*, Fig. 2.

I will now describe my invention as shown in the drawings.

An envelope, A, preferably made of strong water-proof paper, is provided with an end flap of sufficient size to substantially cover the side of the envelope. An eyelet-hole, C, is arranged in the end of the envelope opposite to that at which the flap B is attached, and the flap B is provided at its free end with an eyelet-hole, D, which coincides with eyelet-hole C when the flap is folded over on the envelope. The full address of the consignee is written on the inner face of flap B, as shown in Fig. 1. The name, business-address, trade-mark, &c., of the consignor or shipper are printed on the outer face of flap B, and the initials or mark, &c., of the consignee and the destination of the invoice are written on the outer face of flap B, as shown in Fig. 2. The following or similar information is printed on the outer face of flap B: "Express or railroad companies can always find the full name and address of the consignee on the under side of this flap."

The combined tag and envelope is used in the following manner: The bill or statement is placed in the envelope A, and the flap B is folded over the envelope A, and a cord, hook, or other device for holding the tag to the box, barrel, package, &c., is passed through the eyelets C D, and is then secured to the package, &c., whereby it will hold the flap closed over the envelope; or the envelope can be tacked to the barrel, box, &c., and the free end of the flap is passed under a metal, rubber, or oil-cloth strip tacked over that end of the envelope opposite to the one to which the flap is fastened, whereby the flap will be held closed over the envelope, and in either case can easily be opened in case an employé of a railroad or express company wishes to read the address written on the under side of the flap.

By using the above-described combined tag and envelope the bill or invoices can be sent with the goods, which is a matter of great importance, especially if the goods are perishable, as it is desirable that the purchaser be informed in regard to the prices of the merchandise as soon as possible, so that he can sell immediately. Furthermore, the address is concealed, and dealers cannot ascertain the addresses of the customers of their competitors. At the same time the express and railway companies can easily ascertain the addresses by raising the flap B.

If desired, the address, &c., shown in Fig. 3 can be printed or otherwise produced on the back of the envelope, and the flap placed under the envelope in attaching the name.

By the means for attaching the tag to the merchandise, I refer to the holes C and D, through which the cord or hook is passed. These, as intimated, are re-enforced by eyelets of some suitable material.

The cord or hook employed for securing the tag to the merchandise also serves, as shown, to close or secure the envelope and prevent its contents from escaping in transit.

Having thus described my invention, I claim—

1. A combined tag and envelope, substantially as described, wherein the flap which closes the mouth of the envelope is fastened down by the cord or other device which secures the tag to the merchandise, as set forth.

2. A combined tag and envelope, substantially as described, the flap having an eyelet-hole which, when the said flap is folded down on the envelope, coincides with an eyelet-hole in the envelope, whereby the cord or hook for attaching the tag may be passed through both holes, substantially as set forth.

3. In a combined tag and envelope, the combination, with an envelope, A, having a flap, B, at one end, of the eyelet D in the free end of the flap, and the eyelet C in that end of the envelope opposite the one to which the flap is attached, substantially as herein shown and described, and for the purpose set forth.

In witness whereof I have hereunto signed my name in the presence of two subscribing witnesses.

JOSEPH T. DUNHAM.

Witnesses:
SAM. TRO. SMITH,
PHILIP A. BROWN.